(12) United States Patent
    Wirtz (10) Patent No.: US 8,646,225 B2
(45) Date of Patent: Feb. 11, 2014

(54) IN-GROUND SHELTER

(76) Inventor: Jerry Wirtz, Ponca City, OK (US)

( * ) Notice: Subject to any disclaimer, the term of this patent is extended or adjusted under 35 U.S.C. 154(b) by 591 days.

(21) Appl. No.: 12/924,690

(22) Filed: Sep. 30, 2010

(65) Prior Publication Data

US 2012/0079780 A1    Apr. 5, 2012

(51) Int. Cl.
    *E04H 9/14*    (2006.01)
    *E04H 14/00*    (2006.01)
(52) U.S. Cl.
    USPC .............................. 52/169.6; 52/20; 52/79.1
(58) Field of Classification Search
    USPC .......... 52/19, 20, 21, 64, 169.6, 169.7, 169.9, 52/79.1, 207
    See application file for complete search history.

(56) References Cited

U.S. PATENT DOCUMENTS

| | | | |
|---|---|---|---|
| 984,942 A * | 2/1911 | Leddy, Herbert L. ....... | 52/169.6 |
| 1,778,889 A | 10/1930 | Disbro | |
| 2,281,371 A | 4/1942 | Mugler | |
| 2,601,164 A | 6/1952 | Montgomery | |
| 2,653,468 A | 9/1953 | Rowles | |
| 2,867,857 A | 1/1959 | McCarthy | |
| 3,093,098 A | 6/1963 | Rosenfeld | |
| 3,114,153 A | 12/1963 | Pierson | |
| 3,118,148 A | 1/1964 | Taylor et al. | |
| 3,173,387 A | 3/1965 | Cree, Jr. | |
| 3,208,410 A | 9/1965 | Hayes et al. | |
| 3,343,314 A | 9/1967 | Smith | |
| 3,373,533 A | 3/1968 | Trelfa et al. | |
| 3,568,388 A | 3/1971 | Flachbarth et al. | |
| 3,706,168 A | 12/1972 | Pilish | |
| 3,713,257 A | 1/1973 | Beavers | |
| 3,849,951 A * | 11/1974 | Howle ............................... | 52/19 |
| 3,934,382 A | 1/1976 | Gartung | |
| 4,099,353 A * | 7/1978 | Blunt ............................... | 52/139 |
| 4,126,972 A | 11/1978 | Silen | |
| 4,226,062 A * | 10/1980 | Doane .......................... | 52/169.6 |
| 4,429,495 A | 2/1984 | Aoki | |
| 4,592,175 A | 6/1986 | Werner | |
| 4,914,878 A | 4/1990 | Tamaki et al. | |
| 4,953,734 A | 9/1990 | Stohr | |
| 4,955,166 A * | 9/1990 | Qualline et al. ............. | 52/169.6 |
| 5,065,558 A | 11/1991 | Boatsman | |

(Continued)

OTHER PUBLICATIONS

Family Safe Shelters, Safe Room Options & Features, website address http://familysafeshelters.com/the-shelter/safe-room-options-features/, Nov. 27, 2010, pp. 1-2, Internet, US.

(Continued)

*Primary Examiner* — Basil Katcheves
*Assistant Examiner* — Rodney Mintz
(74) *Attorney, Agent, or Firm* — Edward L. White (57) ABSTRACT

An underground shelter having a flat lid divided into two portions substantially flush with the surrounding ground level and each other when closed having—a first stationary lid portion, and a second moving lid portion, at least one reinforcing member supporting each lid portion; a roller means comprising—at least one linear track, at least one upper track roller, each upper track roller rollingly supporting the second lid portion; at least one ramp defined in the first lid portion, and out of line with the track, adapted to elevate a leading edge roller to a higher level allowing the second lid portion to pass over the first; at least one leading edge roller engaging a ramp; a releasable latch means; a lid retainer means for resisting a lifting force; access means for ingress/egress; and at least one ventilation means for equalizing the pressure.

11 Claims, 6 Drawing Sheets

(56) References Cited

U.S. PATENT DOCUMENTS

| | | | |
|---|---|---|---|
| 5,584,151 | A | 12/1996 | Abou-Rached |
| 5,638,651 | A | 6/1997 | Ford |
| 5,724,774 | A | 3/1998 | Rooney |
| 5,732,512 | A | 3/1998 | Ueno et al. |
| 5,953,866 | A | 9/1999 | Poole |
| 5,974,743 | A | 11/1999 | Vaia |
| 5,979,136 | A | 11/1999 | Marschak |
| 5,992,110 | A | 11/1999 | Clear |
| 6,039,201 | A | 3/2000 | Kesterman et al. |
| 6,047,510 | A | 4/2000 | Gallaway |
| 6,161,345 | A | 12/2000 | Hope et al. |
| 6,308,471 | B1 | 10/2001 | Raynor |
| 6,334,278 | B1 | 1/2002 | Arnold |
| 6,393,776 | B1 | 5/2002 | Waller et al. |
| 6,401,403 | B1 | 6/2002 | Oviedo-Reyes |
| 6,415,557 | B1 | 7/2002 | McCalley |
| 6,415,558 | B1 | 7/2002 | Cherry |
| 6,434,896 | B1 | 8/2002 | Mitchell |
| 6,438,906 | B1 | 8/2002 | Komarowski et al. |
| 6,539,674 | B2 | 4/2003 | Arnold |
| 6,981,347 | B1 | 1/2006 | Walburger |
| 7,080,489 | B2 | 7/2006 | Jedrzejewski |
| 7,127,865 | B2 | 10/2006 | Douglas |
| 7,237,362 | B2 | 7/2007 | Bishop |
| 7,356,970 | B1 | 4/2008 | Frobosilo |
| 7,428,800 | B1 * | 9/2008 | Vaughn et al. ............ 52/19 |
| 7,493,729 | B1 | 2/2009 | Semmes |
| 7,621,209 | B2 | 11/2009 | Bateman et al. |
| 7,690,159 | B1 | 4/2010 | Arnold |
| 7,762,033 | B2 | 7/2010 | Scott et al. |
| D640,390 | S * | 6/2011 | Wirtz ............ D25/33 |
| 8,176,692 | B2 * | 5/2012 | Crow ............ 52/169.6 |
| D684,838 | S * | 6/2013 | Wirtz ............ D8/308 |
| 8,511,005 | B2 * | 8/2013 | Crow ............ 52/169.6 |
| 2003/0167708 | A1 | 9/2003 | Shaw et al. |
| 2003/0172597 | A1 | 9/2003 | Folkena |
| 2004/0003546 | A1 | 1/2004 | Sissons |
| 2006/0032154 | A1 * | 2/2006 | Johnson ............ 52/36.1 |
| 2006/0143995 | A1 * | 7/2006 | Beal ............ 52/169.6 |
| 2006/0254166 | A1 | 11/2006 | Michels et al. |
| 2007/0094963 | A1 | 5/2007 | McDonald et al. |
| 2007/0151186 | A1 | 7/2007 | Hanks et al. |
| 2007/0251159 | A1 * | 11/2007 | Wagner ............ 52/19 |
| 2008/0016611 | A1 * | 1/2008 | Khalaf et al. ............ 4/498 |
| 2008/0098662 | A1 * | 5/2008 | Laffitte Figueras ............ 52/20 |
| 2008/0172954 | A1 * | 7/2008 | Cravens ............ 52/169.6 |
| 2010/0088974 | A1 | 4/2010 | Scott, IV |
| 2010/0115858 | A1 | 5/2010 | Olsen |
| 2011/0277398 | A1 * | 11/2011 | Crow ............ 52/169.6 |
| 2012/0216463 | A1 * | 8/2012 | Crow ............ 52/19 |
| 2012/0222367 | A1 * | 9/2012 | Wirtz ............ 52/79.1 |
| 2013/0212954 | A1 * | 8/2013 | Taylor et al. ............ 52/19 |

OTHER PUBLICATIONS

Rhino Vault Security Structures, Modular Vaults for Guns and Security, website address http://www.rhinovault.com/VAULTROOM.HTM, Mar. 30, 2001, pp. 1-2, Internet, US.

Ground Zero Storm Shelters, Above Ground Safe Rooms/Standard sizes 4x6x6'6" and 4x8x6'6", website address http://www.groundzeroshelters.com/saferooms.html, May 22, 2010, pp. 1-2, Internet, US.

Storm Safe Rooms, Above Ground Shelters Hurricane Safe Rooms, website address http://www.stormsaferoom.com/aboveground/index.htm, Nov. 26, 2002, pp. 1-3, Internet, US.

Smart Safe Tornado Shelters LLC, New for 2011, website address http://www.smartsafeshelters.com/?q=shelters, Jun. 9, 2008, pp. 1-5, Internet, US.

* cited by examiner

IN-GROUND SHELTER

CROSS REFERENCES TO RELATED APPLICATIONS

None.

BACKGROUND OF THE INVENTION a. Field of the Invention

The present invention relates to the field of storm shelters. More particularly, the present invention relates to in-ground shelters which either can be installed in new construction or can be retrofit, for example, in a garage in an existing structure.

b. Description of the Prior Art

The idea of a shelter from dangerous forces such as tornados, hurricanes or bombs has been around for decades. See, for example, Pierson, U.S. Pat. No. 3,114,153 for a Combination Shelter and Swimming Pool. While less than optimally functional (what, for example, does one do about the water in the pool if one needs to use the shelter?), Pierson illustrates that the idea of an in-ground shelter is not new. Presumably, Pierson was focusing his efforts as a shelter that might protect a user from the threat of Soviet nuclear attack. Before Pierson, many people installed simple cellars primarily for food storage, but also for protection from storms. Entrance to these early shelters was usually accomplished by a hinged door.

More relevant to the present invention are Hope et al., U.S. Pat. No. 6,161,345, and Poole, U.S. Pat. No. 5,953,866. Hope et al., claimed a "tornado shelter," and Poole claimed a "storm shelter." Both are for a shelter which is designed to be installed below ground, and which has a sliding substantially flat access door near ground level to allow ingress and egress. The door in Poole, which is the patent closest to the present invention, appears to covers approximately one-third of the top of the shelter. The door sits on rollers, and rolls downwardly and inwardly to open. That is, it rolls down underneath of the rest of the shelter's top.

Poole claims a similar device, but the description in Poole and the drawings are much more limited. There is no description in Poole about how the lid, as shown open in FIG. 6, is prevented from tipping over as it is opened. The force of gravity would, as shown in FIGS. 5 and 6 of Poole, force the leading edge of the lid to tip under its own weight. There is no structure shown or described in Poole which would prevent this from happening. Further, the Poole lid is well above ground level, which may prevent a vehicle from parking above the shelter if installed in a garage and which would also present a tripping hazard.

Ueno et al., U.S. Pat. No. 5,732,512 shows a manhole opening structure. While it is not directly related to the present art, it does allow access to an under-ground cavity, and it does have a substantially flat lid which opens to allow access. The problem with Ueno is that the lid slides on the ground. As the lid slides, it may slide over an uneven ground surface surrounding it, and the sliding would be less than uniform, especially given the debris that might gather around the shelter as a result of the storm. It would be very difficult to open a device such as one described by Ueno in a storm shelter context. Therefore, while Ueno is instructive, it does not show or describe the features of the claimed invention.

The inventor in the present matter, Jerry Wirtz, was also an inventor on Vaughn et al., U.S. Pat. No. 7,428,800. That application discloses and claims a storm shelter having substantially, the entire top of the box defining an opening, the lid adapted to be substantially flush with the surrounding ground level in a closed position, and roller means with a track affixed to each of the side walls near the open top and parallel thereto at least one upper track roller disposed between the lid and each track, each upper track roller supporting the lid as it moves relative to the track, a support means for supporting a leading edge of the lid as it slides over the surrounding ground level, the support means having at least one rail roller adjacent to the back wall disposed between the lid and the track, a lower track roller attached to the lid near the trailing edge, the lower track roller engaging a lower track surface, at least one rail affixed to the underside of the lid between the rail roller and the lid, each rail having a sloped section near the leading edge of the lid, whereby when the leading edge moves away from the back wall, the lid is displaced upwardly by operation of the sloped section against the rail roller, providing additional clearance for the lid as it passes over the ground surface.

SUMMARY OF THE INVENTION

An improved in-ground shelter of the type having a front wall, a back wall, two opposing side walls, a bottom and a top. These walls, the bottom and the top define a substantially rectangular box with an opening defined in the top thereof, a flat lid adapted to cover the opening, and a roller means for alternately rolling the lid to expose or close the open top. The improvement of the present invention comprises, inter alia: a lid divided into two parts and adapted to be substantially flush with the surrounding ground level in a closed position having—a first lid portion remaining stationary over a first portion of the opening and beginning at the back wall, a second lid portion which moves relative to the first lid portion and, in a closed position, begins at the front wall, and a dividing space defined between the first and second lid portions when they are in a closed position; a roller means comprising at least one track near the open top, at least one upper track roller disposed between the second lid portion and each track, each upper track roller rollingly supporting the lid as it moves relative to the track; at least one ramp adjacent to the dividing space and adapted to elevate a roller moving relative to the ramp from a lower level to a higher level, the higher level allowing the second lid portion to pass over the first lid portion; at least one leading edge roller engaging at least one ramp, each leading edge roller adapted to rollingly engage a surface to support a leading edge of the second lid portion as it passes up and over the first lid portion; a latch means releasably engaging the moveable second lid portion into a fixed closed position; a lid retainer means for keeping the second lid portion in position against a lifting force created by a differential pressure between the inside of the shelter and the outside atmosphere during a storm event; and access means for allowing at least one person to enter or leave the shelter, whereby, in a close position the shelter does not present significant lowered areas in the floor into which objects can fall or which pose tripping hazards, both of the lid portions can be reinforced so that regular loads in day-to-day use can be properly supported and unusual loads during storm events are less likely to deform the lid, the lids are less likely to become stuck as a result of debris after a storm, and the shelter can be mounted very near a wall not requiring significant clearance for the lid to be opened.

A cooperating ramp and roller system is disposed adjacent to a division between the two lids. At least one ramp may be mounted either on the fixed or the moving lid. The ramps provide a rolling surface for elevating the moving second lid portion sufficiently to allow it to roll over the top of the first lid portion. If the ramp is disposed on the first lid portion, then the cooperating roller will be affixed to the second lid portion and vice-versa.

A latch means for retaining the second lid in a closed position is provided. The purpose of this latch means is not to resist the force created by differential pressure on the inside and outside of the shelter. The purpose of the latch means is to prevent the second lid portion from rolling into an open position. It holds a first end of the second lid portion near the front wall in a closed position then, upon release, allows the second lid portion to roll to an open position. Preferably, the latch means includes a release mechanism to allow it to be activated from either inside or outside the shelter, and it is further preferable that the release mechanism for the outside of the shelter be recessed or have a removable "key" so that it is flush with the surrounding floor surface.

Lid retainer means for maintaining the lid in place in a closed position are provided. Lid retaining means may include at least one set of cooperating L-brackets, which, when the lid is in a closed position, serve to resist the lifting forces that might be exerted on the lid by a tornado, hurricane, or the like, so as to maintain the lid in a closed position. Securing means may also include at least one chain cooperating with a chain receiver bracket, again serving the function of maintaining the lid in a closed position. Another lid retaining means is a latch movable relative to a fixed connection point for retaining the lid.

Access means are provided for allowing people to enter and egress the shelter. The shelter may include at least one stair rotatably affixed to the front wall; a stair support means may be included for releaseably supporting the stair in a deployed position to be used for a stepping entrance into the shelter. Where the stair is provided, it may also be desirable to provide a handrail which can be releasably attached to the stair for convenience of those entering or exiting the shelter or, alternatively stored within the shelter. Alternatively, a ladder may serve as the means of ingress and egress or fixed stairs. A ladder is more difficult to navigate than stairs. Fixed stairs, as compared to the rotatable stairs, take up an irreducible amount of space in what are the necessarily cramped space within the shelter.

The lid portions may each have at least one reinforcing member supporting it on an underside thereof. Reinforcing members may run from side-to-side of the shelter, or they may run along its longer axis. The reinforcing members strengthen the usually flat plate of the lids against the substantial weight that can be applied to them in a garage-mounting situation. For example, vehicles may roll over the shelter lids applying thousands of pounds of force. The reinforcing member may be integral in the lid, which may have formed ridges or support struts integral thereto.

Ventilation means may be provided for equalizing the pressure between inside and outside of the shelter. The ventilation means may comprise a space defined between the lids and the top of the shelter along the periphery thereof. In addition, or in the alternative, the ventilation means may be one or more ventilation holes or spaces defined in the lid. Preferably, if there is any exposure of a ventilation aperture to the exterior, a structure is presented to prevent debris from entering the shelter through the aperture.

A force-enhancing means may be provided to give additional leverage to force the second lid portion to move into an open position, whereby, those in the shelter can open the shelter to egress even if there is debris resting on the shelter. The force-enhancing means may be a come-along-type device using a pully and cable system to pull the second lid portion open. Alternatively, the force-enhancing means could be a hydrauling or mechanical jack using leverage to push or pull the second lid open.

There have thus been outlined, rather broadly, some of the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

The invention will now be described in greater detail with reference to the drawings, wherein.

DESCRIPTION OF PREFERRED EMBODIMENTS

Figure 1:
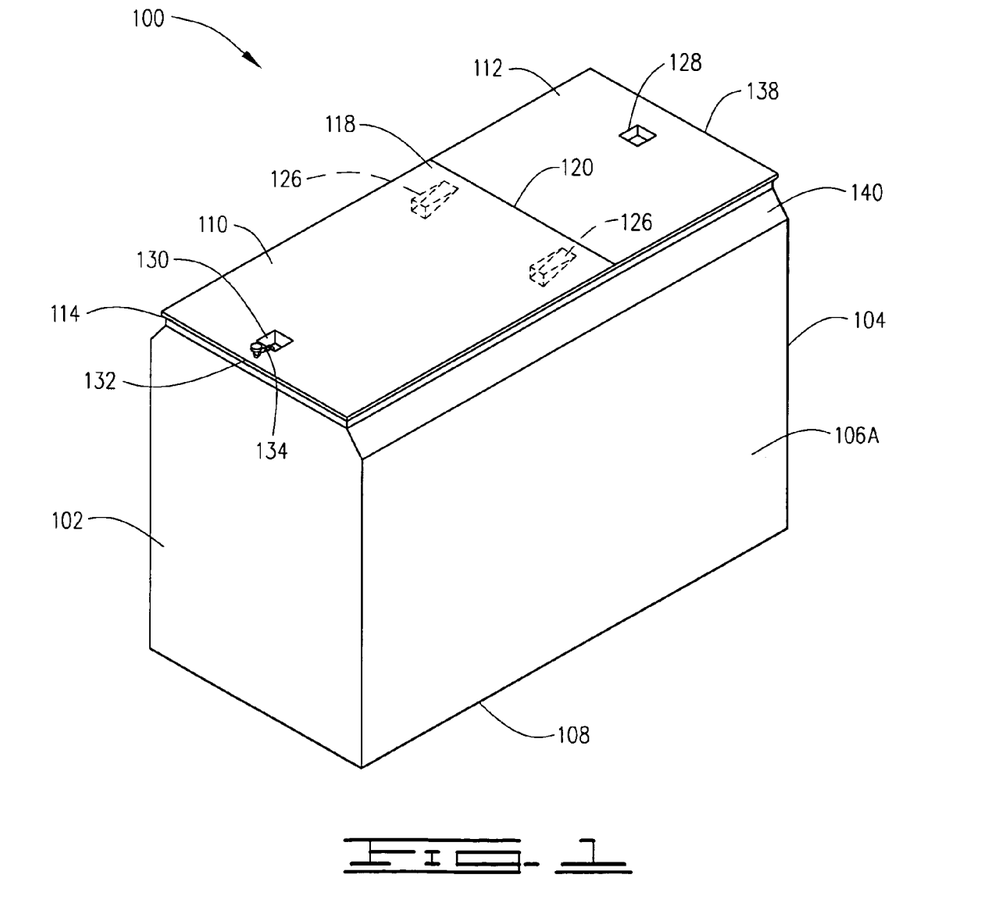
FIG. 1 is a perspective view of a shelter.
Figure 2:
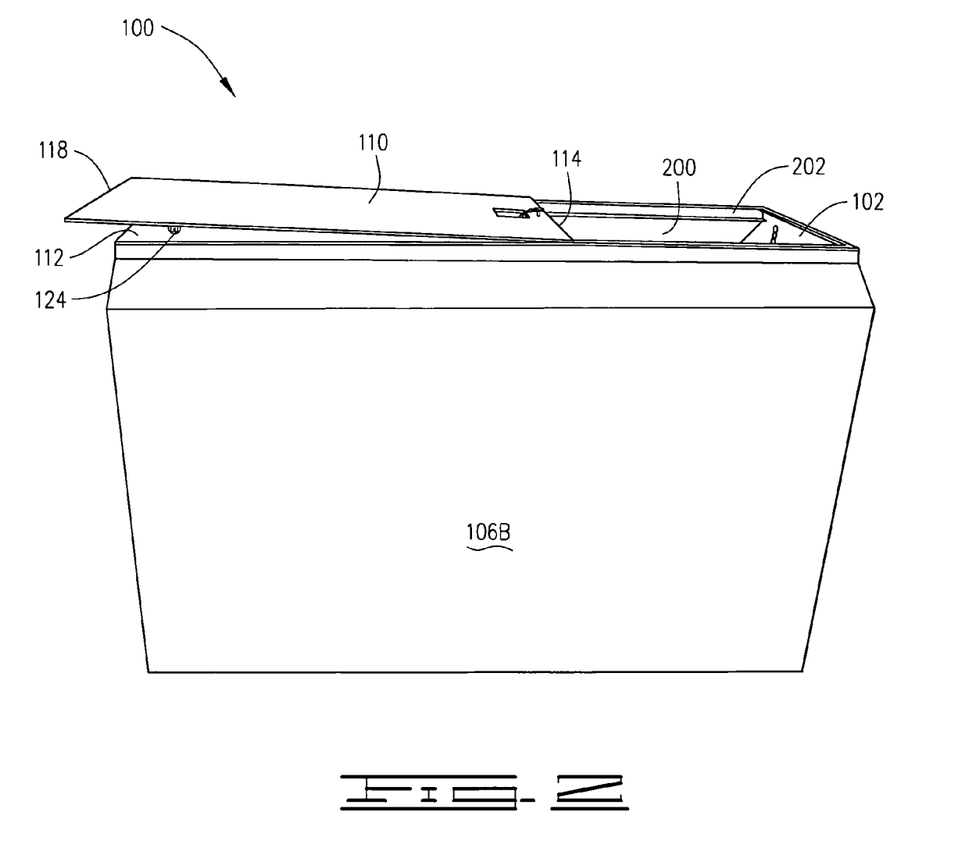
FIG. 2 is a side view of the shelter.

The invention will now be described with reference to the drawings. FIG. 1 shows the shelter 100 having a front wall 102 opposed to a back wall 104, two opposing side walls 106A and 106B and a bottom 108. The first side wall 106A can be seen in FIG. 1, and the second side wall 106B can be seen in FIG. 2. Together, these walls, the lid and the bottom form a substantially rectangular box-like structure defining an open top. The bottom 108 may be substantially flat, or it may angle inward in a similar fashion to the top as shown in FIGS. 1 and 2. FIG. 2 is a perspective side view showing the second lid portion 110 in an open position over the top of the first lid portion 112. In the closed position, the trailing edge 114 of the second lid portion 110 is adjacent to the front wall 102, and the leading edge 118 of the second lid portion 110 is adjacent to a dividing space 120 defined between the two lid portions. This dividing space provides a portion of the "ventilation means" for equalizing pressure between the inside and outside of the shelter, and further ventilation means is provided by a space left open between each lid portion and an adjacent portion of the shelter. A roller 124 can be seen in FIG. 2 disposed between the two lid portions. This is the roller that, in a closed position, rests in the ramp 126 associated with the second lid portion as shown in FIG. 1.

FIG. 1 shows the ventilation grates defined in each lid: 128 in the first lid portion and 130 in the second lid portion. These ventilation grates allow pressure equalization between the inside of the shelter and the outside. As shown, the grates are recessed into the lids, and thus are less likely to be affected by projectiles that are created by storm events. The ventilation grates 128 and 130 comprise a part of the "ventilation means." Adjacent to the ventilation grate 130 in the first lid portion is the key 132 to externally open the shelter. It passes through a keyhole defined in the second lid portion 110 and interacts with the lock mechanism inside the shelter. Preferably, a retaining chain 134 retains the key 132 in close proximity to the shelter. The retaining mechanism may also be a cable, rope, or the like, but it needs to be durable and flexible. The retaining chain keeps the key close to the shelter so that it is not missing or lost when an emergency requires entry to the shelter. The key 132 is a portion of the "latch means." Specifically, the operation of the key passing through the keyhole defined in the second lid to interact with the lock mechanism inside the shelter comprises a portion of the latch means having a mechanism accessible for release thereof on both the outside and inside of the shelter.

The side walls 106A and B are shown with an inwardly tapered section 140 near the open top, whereby the size and weight of the lid are reduced and cars with smaller wheel bases are able to park above the lid without having to drive thereon. If the side walls did not have the tapered section 140, the lid would be wider, thus increasing its weight and, more importantly, its width which might require cars with narrower wheelbases to park thereon, which, though allowable, is undesirable. The same sort of tapering of the side walls may be provided at the bottom of the shelter. This tapering may allow concrete poured down the sidewalls to more easily flow underneath the shelter to support and stabilize it.

The open top 200 can be seen in FIG. 2, which is a side view with the second lid portion 110 in an open position. A leading roller 124 affixed to the second lid portion 110 rolls on an upper surface of the first lid portion 112. In a closed position as shown in FIG. 1, each leading roller 124 rests in a ramp 126. As the second lid portion 110 is displaced away from the front wall 102 the each ramp 126 elevates each leading roller 124 from a lower position to rolling along the upper surface of the first lid portion 112. The trailing edge 114 is supported by a trailing roller 402 shown in FIG. 4. Each trailing edge roller 402 rolls along a side rail 202. The fact that the side rails 202 terminate at the dividing space 120 and the fact that the side rails are at a lower level provide an inherent mechanical stop for the opening movement of the second lid portion 110. The trailing rollers 402 impact the first lid portion 112 and can roll no further.

Figure 3:
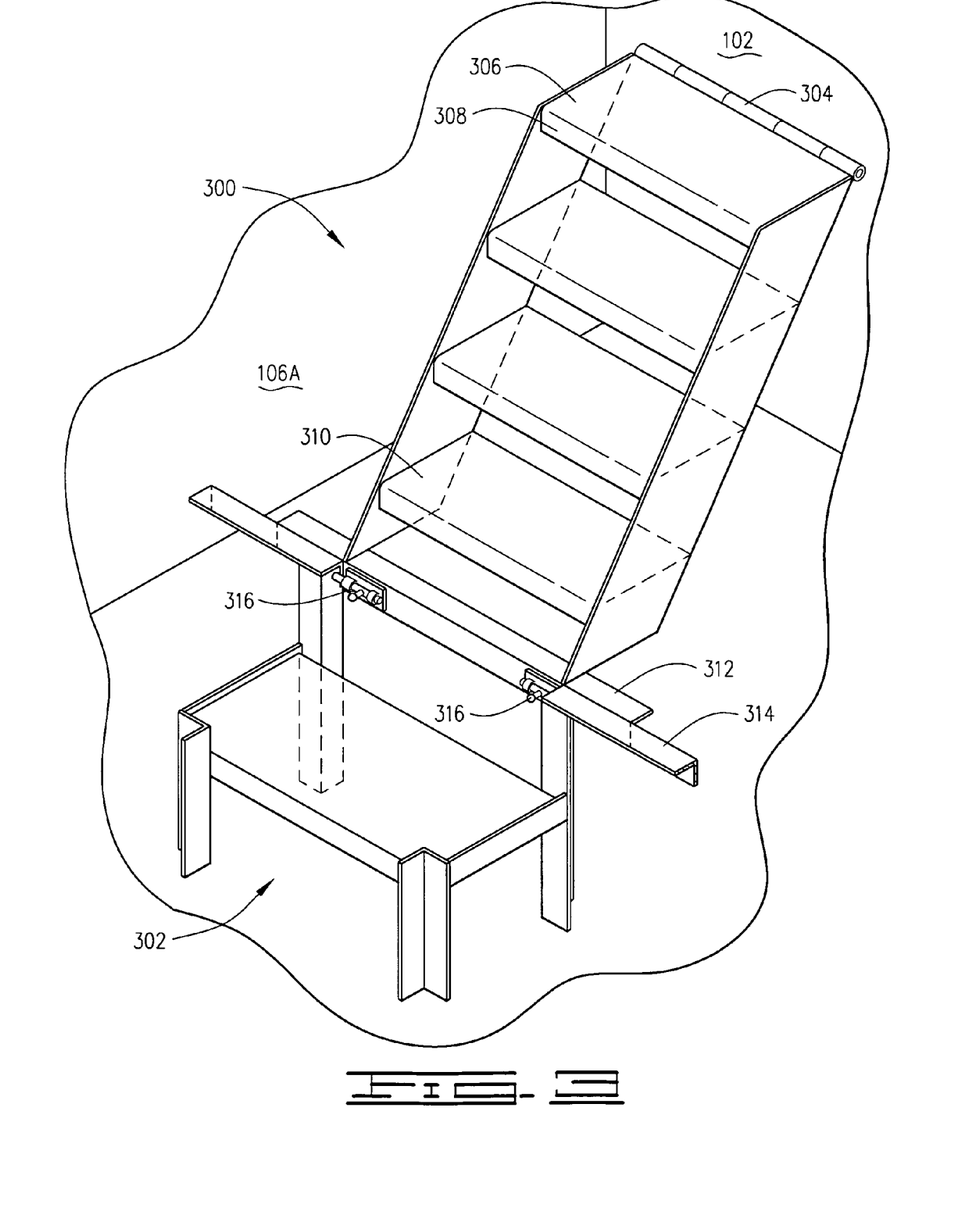
FIG. 3 is a partial view of stairs.

In FIG. 3, stairs 300 are shown affixed to or at least located adjacent to the frontwall 102. Instead of stairs, a ladder could be provided. Shelters can be provided with any number of entrance means, such as the ladder shown in Hope, fixed stairs as shown in Poole, or deployable stairs, shown in the figures and described herein. A step-stool 302 for use in cooperation with the stairs 300 is also shown. The stairs 300 have a rotation point about a hinge 304 affixed to the frontwall 102. The stairs 300 have at least one upper stair 306 and at least one lower stair 310. Each stair may have a supporting face 308. If there is only one stair, the single stair will be both the upper and the lower stair. A stair support bracket 312 is attached to a lower portion of the stairs 300. The stair support bracket 312 can cooperate with the seat support bracket 314 affixed to the side walls 106A and B. A aligned holes are defined in both the stair support bracket 314 for receiving a stair pin 316. The stair pin 316 serves to hold the stairs 300 in place to serve as stepping surfaces for entering or exiting the shelter. When the stair pins 316 are released, the stairs 300 rotate on the hinge 304 into a position adjacent with the frontwall 102. Collectively, the structures described in this paragraph are referred to herein as "access means."

Figure 4:
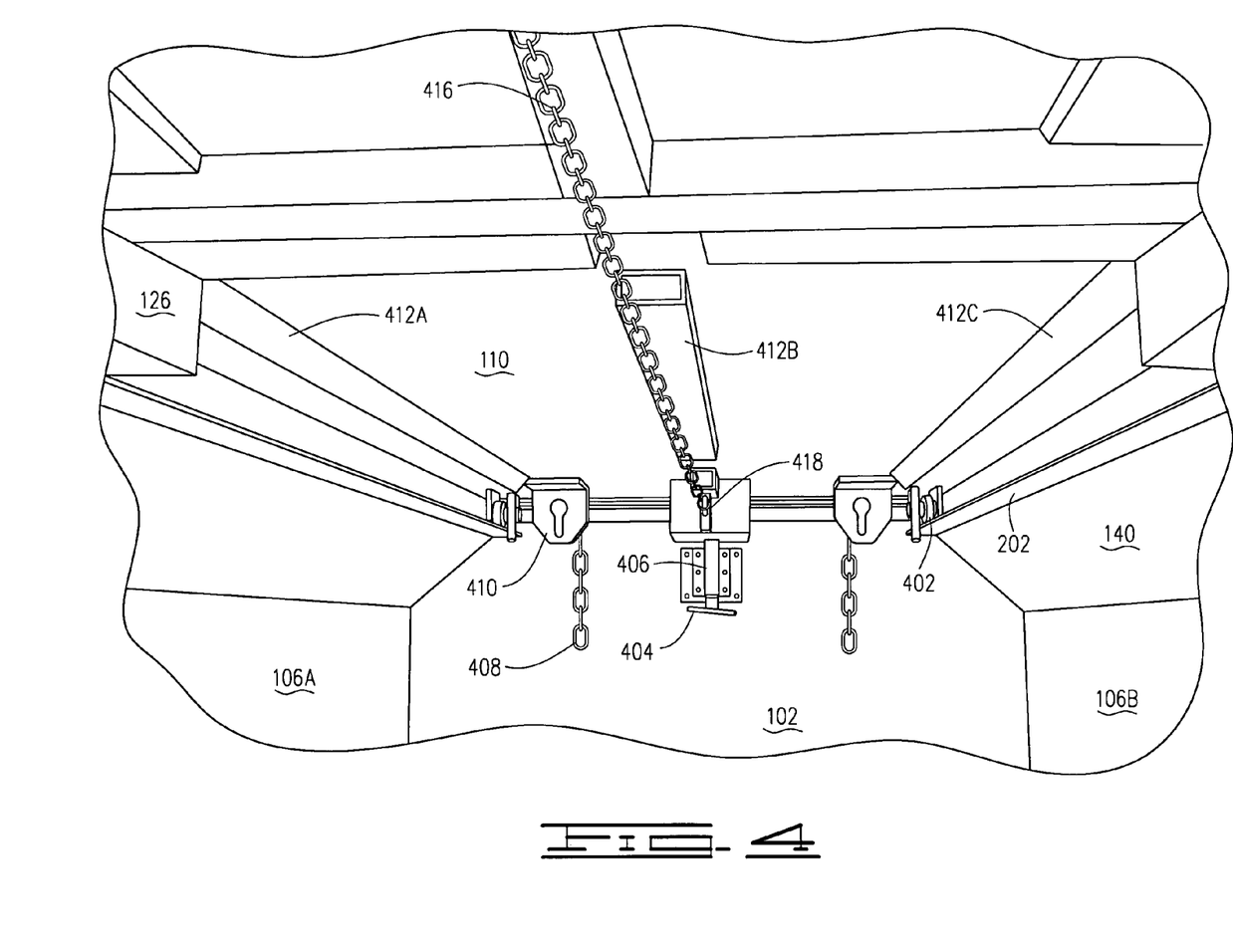
FIG. 4 is a partial view of the underside of primarily the second lid portion and adjoining shelter walls.

FIG. 4 shows the second lid portion 110 from a vantage point at the dividing space 120 between the two lid portions. The inside portion of the lock mechanism 406 can be seen with the internal release handle 404, are a portion of the "latch means." Supplemental safety chains 408 are shown to help secure the second lid portion 110 in a closed position during a storm event. The chains 408 are secured to the front wall 102 and are adapted to be received in cooperating receiver 410 affixed to the second lid portion 110. Reinforcing structural members 412A, B, and C are affixed to the second lid portion 110 to provide additional structural integrity thereto. At the upper edges of FIG. 4, the ramps 126 can be seen. The supplemental safety chains 408 are a portion of the "lid retainer means."

Reinforcing members can be seen in FIG. 4 as 412 A-C, all of which are shown affixed to the second lid portion 110. Similar reinforcing members are affixed to the first lid portion 112, though these reinforcing members are un-numbered. One reinforcing member on the first lid portion 112 can be seen running substantially parallel to the chain 416. These reinforcing members strengthen the lid portions against day-to-day loads (such as a car parked on top of the shelter) and against the unusual loads (such as falling portions of a structure) that may be placed on the lid portions during a storm event. The reinforcing members are affixed to an underside of each lid portion so that they do not present a trip hazard on an upper side. Further, the operation of the rolling mechanism allows both lid portions to be reinforced without requiring an offset surface of the lids as was previously required to reinforce both lid portions. Compare the unreinforced fixed lid portion in Shaw, et al., U.S. Pub. No. 2003/1067708 with the potentially reinforced, but offset, lid portions in U.S. Pat. No. 3,849,951 to Howle.

A chain 416 that is part of the force enhancing means. A first end of the chain 416 is affixed to a bracket 418 near the trailing edge 114. The other end of the chain is attached to a come along in case the second lid portion 110 becomes obstructed during a storm event. A cooperating back wall emergency hook are adapted to receive a device commonly referred to as a come-along, which serves to provide additional force to open the second lid portion 110. The come-along is a ratchet-based device which has a handle for applying a ratcheting force and a cable that can be tightened thereby. The handle operates the ratchet mechanism, tightening the chain 416. The handle gives substantial leverage which allows a user to exert substantial pulling force via the cable. Alternatively, a hydraulic or ratchet-type jack mechanism can be mounted so as to apply a pushing force to the second lid portion 110. In the push-type setup, the jack mechanism will be affixed to either the end wall 102 or a side wall 106A or B and also to the second lid portion. By operating the jack mechanism, the second lid portion will be pushed relative to the mounting point away from the end wall 102 and into an open position. Collectively, the components in this paragraph will be referenced as a "force-enhancing means."

Figure 5:
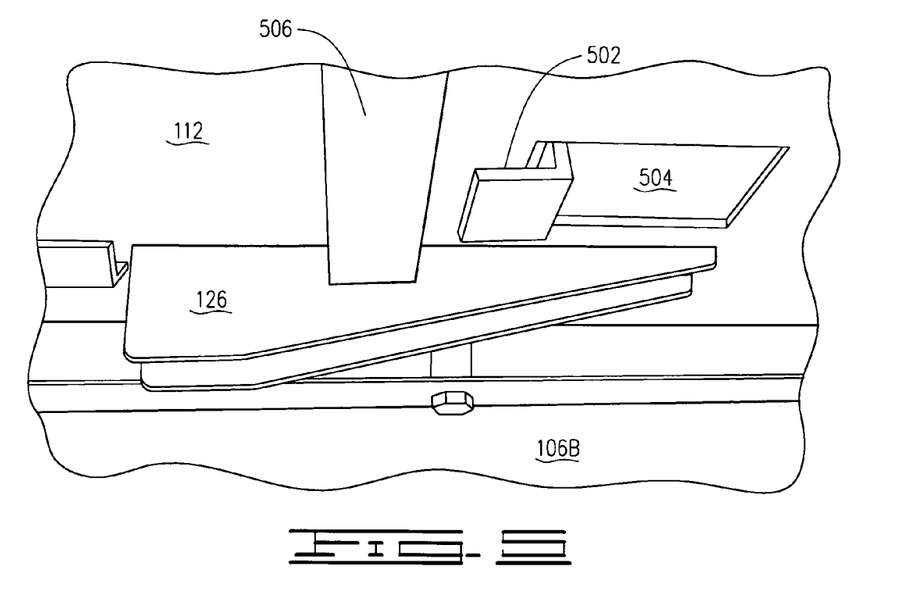
FIG. 5 is a detail view of a ramp and a configuration of a lid retainer means.
Figure 7:
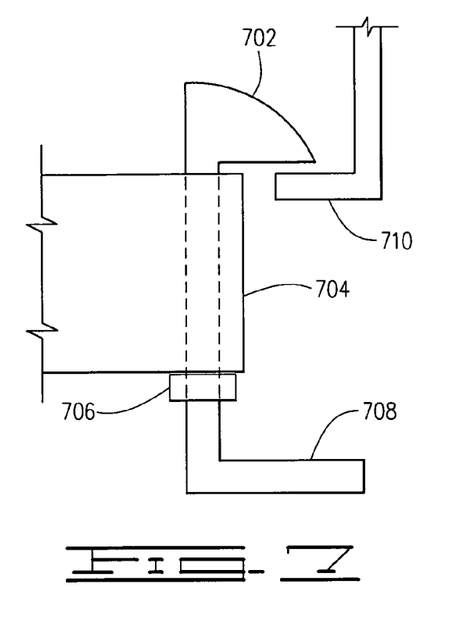
FIG. 7 is a detail view of another configuration of a lid retainer means.
Figure 8:
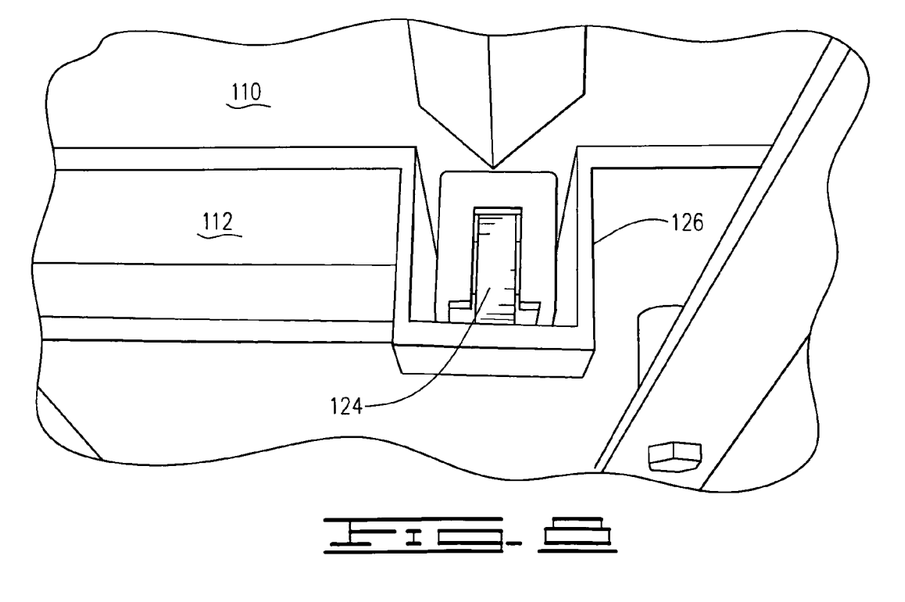
FIG. 8 is a detail view of a ramp and roller configuration.

FIG. 5 illustrates both a ramp 126 and a lid retainer means for keeping the second lid portion in position against a lifting force created by a differential pressure between the inside of the shelter and the outside atmosphere during a storm event. The lid retainer means shown in FIG. 5 is comprised of a clip 502 affixed to the second lid portion 110. The clip 502 is received within a hole 504 defined in the first lid portion 112. In the closed and locked position, the clip 502 is prevented from lifting up against a lower edge of the fixed first lid portion 112. Alternatively, the lid retainer means may be comprised of a cooperating chain 408 and receiver 410 as shown in FIG. 4. The lid retainer means may also be a releasable latch mounted on one or more of the side walls cooperating with a stop mounted on the second lid portion 110 or vice versa. FIG. 5 also shows a reinforcing structural member 506 affixed to an underside of the first lid portion 112. An alternative lid retainer means is shown in FIG. 7. In this embodiment of the lid retainer means, it is comprised of a rotatable latch 702 mounted to one of the walls. The mounting clip 704 rotatably receives the latch, and a keeper 706 prevents it from being displaced upwardly. A handle 708 may be provided to ease rotation of the latch. The latch 702 cooperates with a hook 710 affixed to the second lid portion 710. Alternatively, the clip may 704 may be affixed to the second lid portion 110 with the hook 710 affixed to one of the walls of the shelter. In combination, the components referenced in this paragraph will be referred as a "lid retainer means."

Figure 6:
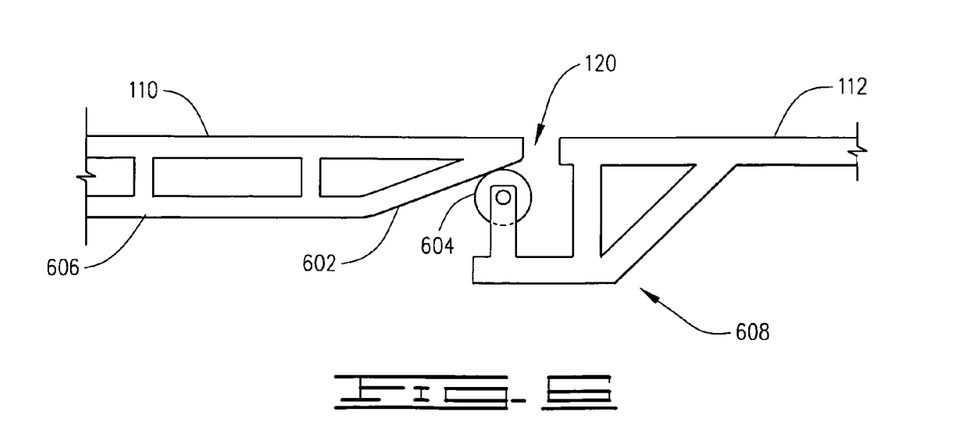
FIG. 6 is a detail view of an alternate ramp and roller configuration.

The shelter of the present invention has at least one ramp adjacent to the dividing space and adapted to elevate a roller moving relative to the ramp from a lower level to a higher level, the higher level allowing the second lid portion to pass over the first lid portion; and at least one leading edge roller engaging at least one ramp, each leading edge roller adapted to rollingly engage a surface to support a leading edge of the second lid portion as it passes up and over the first lid portion. One configuration of the cooperating ramp and roller mechanism is shown in FIGS. 1, 2, 5 and 8. In this first configuration, the roller 124 is affixed to the second lid portion 110, and the ramp 126 is affixed to the first lid portion 112. FIG. 6 shows an alternate configuration with a ramp 602 affixed to the second lid portion 110 and a cooperating roller 604 affixed to the first lid portion 112. A rail 606 affixed to the second lid portion provides a rolling surface for the roller 604. The roller 604 is mounted below the surface of the first lid portion 112 by a bracket 608.

While the invention has been shown, illustrated, described and disclosed in terms of embodiments or modifications which it is assumed, the scope of the invention should not be deemed to be limited by the precise embodiment or modification therein shown, illustrated, described or disclosed. Such other embodiments or modifications are intended to be reserved especially as they fall within the scope of the claims herein appended.

Thus having described the field of the invention, the prior art, the attached drawings, the summary of the invention, and the detailed description of the preferred embodiments, I claim:

1. An underground shelter having a front wall, a back wall, two opposing side walls, a bottom and a top defining a substantially rectangular box with an opening defined in the top, a flat lid adapted to cover the opening, a roller means for alternately rolling the lid to expose or close a portion of the opening defined in the top, the improvement comprising:
   a. the lid divided into two portions and adapted to be substantially flush with a surrounding ground level in a closed position having
      i. a first lid portion remaining stationary over a first portion of the opening and beginning at the back wall,
      ii. a second lid portion which moves relative to the first lid portion and, in the closed position, begins at the front wall,
      iii. a dividing space defined between the first and second lid portions when the first and second lid portions are in the closed position, and
      iv. each lid portion having an upper surface lying in a same plane and not offset from one another vertically;
   b. the roller means comprising
      i. at least one linear track positioned near the opening defined in the top,
      ii. at least one upper track roller disposed between the second lid portion and each track, each upper track roller rollingly supporting the lid as the lid moves relative to the track;
   c. at least one ramp defined in the first lid portion adjacent to the dividing space, and out of line with the track, and adapted to elevate a leading edge roller moving relative to the ramp from a lower level to a higher level, the higher level allowing the second lid portion to pass over the first lid portion;
   d. at least one of the leading edge rollers engaging the at least one ramp, each leading edge roller adapted to rollingly engage a surface to support a leading edge of the second lid portion as the second lid portion passes up and over the first lid portion;
   e. a latch means releasably engaging the moveable second lid portion into a fixed closed position;
   f. a lid retainer means for keeping the second lid portion in position against a lifting force created by a differential pressure between an inside of the shelter and an outside atmosphere during a storm event; and
   g. access means for allowing at least one person to enter or leave the shelter.

2. The shelter of claim 1, each ramp affixed to the first lid portion, and each leading edge roller being affixed to the second lid portion.

3. The shelter of claim 1, each ramp affixed to the second lid portion and each leading edge roller affixed to the first lid portion.

4. The shelter of claim 1, the first lid portion having at least one reinforcing member supporting the first lid portion on an underside thereof.

5. The shelter of claim 1, the second lid portion having at least one reinforcing member supporting the second lid portion on an underside thereof.

6. The shelter of claim 1, each lid portion having at least one reinforcing member supporting the respective lid portion on an underside thereof.

7. The shelter of claim 1 further having at least one ventilation means for equalizing the pressure on the inside and outside of the shelter.

8. The shelter of claim 1, the latch means having a mechanism accessible for release thereof on both the outside and inside of the shelter.

9. The shelter of claim 1 further having a force-enhancing means for additional leverage to force the second lid portion to move into an open position, whereby, those in the shelter can open the shelter to egress even if there is debris resting on the shelter.

10. An underground shelter having a front wall, a back wall, two opposing side walls, a bottom and a top defining a substantially rectangular box with an opening defined in the top, a flat lid adapted to cover the opening, a roller means for alternately rolling the lid to expose or close the opening defined in the top, the improvement comprising:
   a. the lid divided into two portions and adapted to be substantially flush with a surrounding ground level in a closed position having
      i. a first lid portion remaining stationary over a first portion of the opening and beginning at the back wall,
      ii. a second lid portion which moves relative to the first lid portion and, in the closed position, begins at the front wall,
      iii. a dividing space defined between the first and second lid portions when the first and second lid portions are in the closed position,
      iv. at least one reinforcing member supporting each lid portion on an underside thereof, and
      v. each lid portion having an upper surface lying in a same plane and not offset from one another vertically;
   b. the roller means comprising
      i. at least one linear track positioned near the opening defined in the top,
      ii. at least one upper track roller disposed between the second lid portion and each track, each upper track roller rollingly supporting the lid as the second lid portion moves relative to the track;
   c. at least one ramp defined in the first lid portion adjacent to the dividing space, and out of line with the track, and adapted to elevate a leading edge roller moving relative to the ramp from a lower level to a higher level, the higher level allowing the second lid portion to pass over the first lid portion;
   d. at least one of the leading edge rollers engaging the at least one ramp, each leading edge roller adapted to rollingly engage a surface to support a leading edge of the second lid portion as the second lid portion passes up and over the first lid portion;
   e. a latch means releasably engaging the moveable second lid portion into a fixed closed position, the latch means having a mechanism accessible for release thereof on both an outside and inside of the shelter;
   f. a lid retainer means for keeping the second lid portion in position against a lifting force created by a differential pressure between the inside of the shelter and the outside atmosphere during a storm event;
   g. access means for allowing at least one person to enter or leave the shelter; and
   h. at least one ventilation means for equalizing the pressure on the inside and outside of the shelter.

11. The shelter of claim 10 further having a force-enhancing means for additional leverage to force the second lid portion to move into an open position, whereby, those in the shelter can open the shelter to egress even if there is debris resting on or near the shelter in the wake of a storm.

* * * * *